Patented July 23, 1935

2,008,979

UNITED STATES PATENT OFFICE 2,008,979

BLACK PAINT MATERIAL FROM HARDWOOD PITCH

Louis J. Figg, Jr., Kingsport, Tenn., assignor to Eastman Kodak Company, Rochester, N. Y., a corporation of New York No Drawing. Application September 11, 1931, Serial No. 562,266

6 Claims. (Cl. 134—1)

This invention relates to paints containing materials made from hardwood pitch. One object of my invention is to prepare from hardwood pitch a substance which can be used to make a waterproof paint. A further object is to produce a waterproof paint or lacquer from a substance prepared from hardwood pitch. Other objects will hereinafter appear.

The material known as hardwood pitch is the residue left when hardwood tar is subjected to distillation by live steam, closed coil, vacuum or fire still distillation. When hardwood pitch is dissolved in such solvents as methanol, methyl acetone, acetone, etc., the product is not a paint or lacquer which on drying leaves a waterproof film, but is only a stain.

I have found that by sulfonating hardwood pitch I obtain a product which can be dissolved in an organic solvent, such as methyl acetone or acetone, to form a black lacquer paint which gives a waterproof film. My invention is carried out in the following manner.

I use hardwood pitch having a flow point of from 35° C. to 110° C., preferably of about 100° C. This is heated to 170° C. in an open vessel over a gas flame or other heating medium. The pitch is agitated at a moderate rate, while concentrated sulfuric acid is slowly added from a dropping funnel or tank until from 3 to 5 parts by weight have been added for each 100 parts by weight of hardwood pitch. After the addition of sulfuric acid is complete, the mixture is kept at 170° C. and agitated for one hour, after which it is allowed to cool to a hardened mass. The product has a markedly greater tensile strength than the original hardwood pitch. The mass can be broken up and pulverized to a jet black powder.

I prepare a fast-drying, black lacquer paint by dissolving 400 grams of my sulfonated wood pitch in a liter of methyl acetone or acetone. The film formed by this paint is durable, non-shattering, and waterproof. The paint may be improved and the drying slowed up by the addition of from 10% to 15% of linseed oil, together with a small amount of a softening agent such as castor oil, tricresyl phosphate, or dibutyl phthalate. I may, of course, vary the proportions of the ingredients of my paint, and I may use other solvents, other drying oils, and/or other softening agents.

What I claim as my invention and desire to be secured by Letters Patent of the United States is:

1. A frangible, acetone-soluble sulfonated hardwood pitch.

2. A composition of matter comprising a frangible, acetone-soluble sulfonated hardwood pitch.

3. A coating composition comprising a frangible, acetone-soluble sulfonated hardwood pitch and an organic solvent therefor.

4. A coating composition comprising a frangible, acetone-soluble sulfonated hardwood pitch and acetone.

5. A coating composition comprising a frangible, acetone-soluble sulfonated hardwood pitch and methyl acetone.

6. A coating composition comprising a frangible, acetone-soluble sulfonated hardwood pitch, an organic solvent therefor, a drying oil and a softening agent for the sulfonated hardwood pitch.

LOUIS J. FIGG, JR.